United States Patent
Jin et al.

(10) Patent No.: US 10,771,602 B2
(45) Date of Patent: Sep. 8, 2020

(54) MOBILE TERMINAL AND BATTERY COVER

(71) Applicant: JRD COMMUNICATION (SHENZHEN) LTD, Shenzhen, Guangdong (CN)

(72) Inventors: Xiulu Jin, Guangdong (CN); Yanwen Chen, Guangdong (CN); Xiaohui Lv, Guangdong (CN); Qi Yu, Guangdong (CN)

(73) Assignee: JRD COMMUNCATION (SHENZHEN) LTD, Shenzhen (CN)

( * ) Notice: Subject to any disclaimer, the term of this patent is extended or adjusted under 35 U.S.C. 154(b) by 299 days.

(21) Appl. No.: 15/743,271

(22) PCT Filed: Apr. 11, 2017

(86) PCT No.: PCT/CN2017/080067
§ 371 (c)(1),
(2) Date: Jan. 9, 2018

(87) PCT Pub. No.: WO2018/082254
PCT Pub. Date: May 11, 2018

(65) Prior Publication Data
US 2020/0084309 A1    Mar. 12, 2020

(30) Foreign Application Priority Data
Nov. 4, 2016   (CN) .......................... 2016 1 0976723

(51) Int. Cl.
*H04M 1/02* (2006.01)
*G09G 3/34* (2006.01)
(Continued)

(52) U.S. Cl.
CPC ........ *H04M 1/0266* (2013.01); *G09G 3/3433* (2013.01); *H04W 52/027* (2013.01);
(Continued)

(58) Field of Classification Search
CPC .............. H04M 1/0266; G09G 3/3433; G09G 2310/08; G09G 2330/0213;
(Continued)

(56) References Cited

U.S. PATENT DOCUMENTS

| | | | |
|---|---|---|---|
| 2012/0169676 A1* | 7/2012 | Peng .................... | G09G 3/3433 345/204 |
| 2013/0176237 A1 | 7/2013 | Chu | |

(Continued)

FOREIGN PATENT DOCUMENTS

| | | |
|---|---|---|
| CN | 103442110 A | 12/2013 |
| CN | 103747123 A | 4/2014 |

(Continued)

*Primary Examiner* — Yuwen Pan
*Assistant Examiner* — Angelica M Perez

(57) ABSTRACT

The present disclosure discloses a mobile terminal and a battery cover of mobile terminal, the battery cover of mobile terminal includes a main control circuit, a power management circuit, a touch circuit and an e-Ink; wherein the main control circuit, the power management circuit and the touch circuit are connected to the e-Ink respectively; the main control circuit and the power management circuit are connected to the mobile terminal respectively; the main control circuit is connected to the touch circuit; the power management circuit is configured to supply power to the e-Ink; the touch circuit is configured to receive a screen changing operation of the e-Ink; and the main control circuit is configured to receive data from the touch circuit, communicate with the mobile terminal and display contents of communication on the e-Ink.

18 Claims, 3 Drawing Sheets

(51) Int. Cl.
*H04W 52/02* (2009.01)
*G06F 3/041* (2006.01)
(52) U.S. Cl.
CPC ....... *H04W 52/0254* (2013.01); *G06F 3/0416* (2013.01); *G09G 2310/08* (2013.01); *G09G 2330/021* (2013.01); *G09G 2354/00* (2013.01)
(58) Field of Classification Search
CPC ......... G09G 2354/00; H04W 52/0254; H04W 52/027; G09F 3/0416
See application file for complete search history.

(56) References Cited

U.S. PATENT DOCUMENTS

| | | | |
|---|---|---|---|
| 2013/0222208 A1 | 8/2013 | Gorilovsky et al. | |
| 2016/0026423 A1* | 1/2016 | Zenoff | G06F 3/1407 |
| | | | 345/156 |
| 2016/0378246 A1* | 12/2016 | Kim | G06F 3/041 |
| | | | 345/173 |
| 2017/0214434 A1* | 7/2017 | Hong | H04B 1/3888 |
| 2017/0309235 A1* | 10/2017 | Garcia Manchado | G09G 3/3208 |

FOREIGN PATENT DOCUMENTS

| | | | |
|---|---|---|---|
| CN | 103442110 A | * | 5/2014 |
| CN | 203588141 U | | 5/2014 |
| CN | 203708303 U | | 7/2014 |
| CN | 104079719 A | | 10/2014 |
| CN | 104123917 A | | 10/2014 |
| CN | 204795192 U | | 11/2015 |
| CN | 205510122 U | | 8/2016 |
| JP | 2008017402 A | | 1/2008 |
| WO | 2013177521 A1 | | 11/2013 |

* cited by examiner

MOBILE TERMINAL AND BATTERY COVER

CROSS-REFERENCE TO RELATED APPLICATIONS

The present application is a 35 U.S.C. § 371 National Phase conversion of International (PCT) Patent Application No. PCT/CN2017/080067 filed Apr. 11, 2017, which claims foreign priority of Chinese Patent Application No. 201610976723.4, filed on Nov. 4, 2016 in the State Intellectual Property Office of China, the contents of all of which are hereby incorporated by reference.

TECHNICAL FIELD

Embodiments of the present disclosure generally relate to mobile terminal technology, and specifically relate to a mobile terminal and a battery cover.

BACKGROUND

At present, LCD or AMOLED is used as a display screen of smart phone in the market, the LCD or AMOLED is an active light-emitting device with high power consumption, and is one of the main power consumption devices of the smart phone, which affects battery life of the smart phone seriously. An LCD or AMOLED screen has high brightness, light emitted by which would stimulate eyes seriously. Using the smart phones for long time would lead to eye fatigue easily, and even cause loss of vision. The backlight projection design of the screen of the smart phones would also make it difficult for user to read under the strong light, and would lead to perspective restrictions.

SUMMARY

The present disclosure provides a mobile terminal and a battery cover to solve technical problems of high power consumption, high brightness, difficulty in reading under the strong light and having perspective restrictions of the screen of smart phone.

In order to solve the above-mentioned problems, a technical scheme adopted by the present disclosure is to provide a battery cover of mobile terminal, including a main control circuit, a power management circuit, a touch circuit, a timing controller circuit, an e-Ink and a storage circuit; wherein the power management circuit, the touch circuit and the timing controller circuit are connected to the e-Ink respectively; the main control circuit and the power management circuit are connected to the mobile terminal respectively; the touch circuit, the timing controller circuit and the storage circuit are connected to the main control circuit respectively; the power management circuit is a battery connector and is configured to supply power to the e-Ink; the touch circuit is configured to receive a screen changing operation of the e-Ink; the main control circuit is configured to receive data from the touch circuit, communicate with the mobile terminal and drive the e-Ink to display contents of communication via the timing controller circuit; and the storage circuit is configured to store information processed by the main control circuit.

Another technical scheme adopted by the present disclosure is to provide a battery cover of mobile terminal including a main control circuit, a power management circuit, a touch circuit and an e-Ink; wherein the main control circuit, the power management circuit and the touch circuit are connected to the e-Ink respectively; the main control circuit and the power management circuit are connected to the mobile terminal respectively; the main control circuit is connected to the touch circuit; the power management circuit is configured to supply power to the e-Ink; the touch circuit is configured to receive a screen changing operation of the e-Ink; and the main control circuit is configured to receive data from the touch circuit, communicate with the mobile terminal and display contents of communication on the e-Ink.

Another technical scheme still adopted by the present disclosure is to provide a mobile terminal including a terminal body and the battery cover of above-mentioned.

Compared with the prior art, the battery cover of the present disclosure has low power consumption because the e-Ink does not consume power at the time when user is reading, but consumes power only when the page is refreshed. The e-Ink looks more like the printed text so that the eyes would be more relaxed. The e-Ink has a large viewing angle and is visible under strong light, which may enhance users' reading experience.

BRIEF DESCRIPTION OF THE DRAWINGS

In order to illustrate the technical schemes in the embodiments of the present disclosure more clearly, the accompanying drawings to be used in the description of the examples will be briefly described below. It is obviously that the accompanying drawings in the following description are merely some embodiments of the present disclosure, and for those ordinary skilled in the art, which may obtains other accompanying drawings according to these accompanying drawings without departing from the creative work, wherein.

DETAILED DESCRIPTION

The technical schemes described in the embodiments of the present disclosure will now be described clearly and completely in conjunction with the accompanying drawings in the embodiments of the present disclosure. Apparently, the described embodiments are only part of the embodiments of the disclosure and are not intended to be exhaustive. All of other embodiments obtained by those ordinary skilled in the art based on embodiments in the present disclosure without making creative work are within the scope of the present disclosure.

Figure 1:
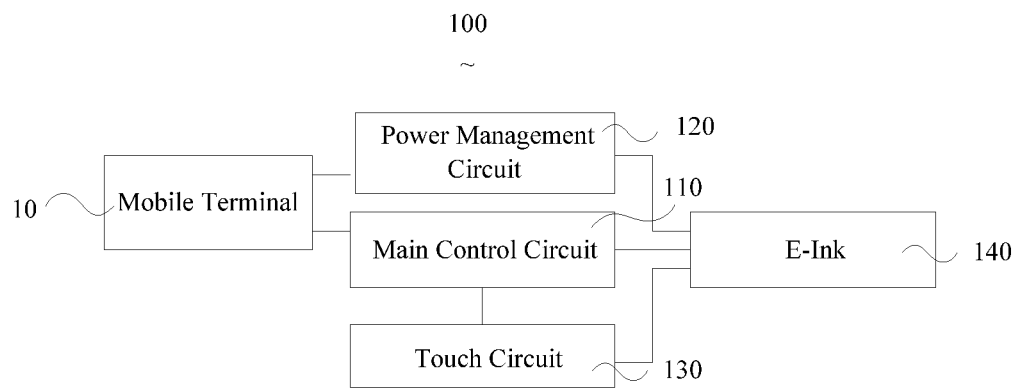
FIG. 1 is a schematic diagram of the structure of a battery cover of a mobile terminal according to a first embodiment of the present disclosure.

Referring to FIG. 1, a schematic diagram of the structure of a battery cover of a mobile terminal according to a first embodiment of the present disclosure is depicted.

As shown in FIG. 1, the battery cover 100 may include a main control circuit 110, a power management circuit 120, a touch circuit 130 and an e-Ink 140.

In one embodiment, the main control circuit 110, the power management circuit 120 and the touch circuit 130 may be connected to the e-Ink 140 respectively; the main control circuit 110 and the power management circuit 120 may be connected to the mobile terminal 10 respectively. The main control circuit 110 may be connected to the touch circuit 130. The power management circuit 120 may be configured to supply power to the e-Ink 140. The touch circuit 130 may be configured to receive a screen changing operation of the e-Ink 140, the screen changing operation may include turning pages, backing and returning to home page etc. The main control circuit 110 may be configured to receive data from the touch circuit 130, communicate with the mobile terminal 10 and display contents of communication on the e-Ink 140 so that the e-Ink 140 can be another display screen of the mobile terminal 10. In this embodiment, main body of the battery cover 100 may define a cavity, in which the e-Ink 140 may be fitted.

The battery cover 100 of the present disclosure has low power consumption because the e-Ink 140 does not consume power at the time when user is reading, but consumes power only when the page is refreshed. The e-Ink 140 looks more like the printed text so that the eyes would be more relaxed. The e-Ink 140 has a large viewing angle and is visible under strong light, which may enhance users' reading experience.

In one embodiment, the main control circuit 110 may be connected to the mobile terminal 10 through a Serial Peripheral Interface SPI or BLUETOOTH BT, through which data is transmitted between the main control circuit 110 and the mobile terminal 10. The main control circuit 110 may be connected to the touch circuit 130 through a Serial Peripheral Interface SPI or an I2C bus. The main control circuit 110 may be connected to the e-Ink 140 through a Serial Peripheral Interface SPI.

Particularly, the main control circuit 110 may be connected to the touch circuit 130, the e-Ink 140 and the mobile terminal 10 through the Serial Peripheral Interface SPI. The Serial Peripheral Interface (SPI) is a high-speed, full-duplex, synchronous communication bus, and only requires four lines for data transmission, which can save the number of chip pins. The Serial Peripheral Interface SPI has well commonality, such that the Serial Peripheral Interface could be compatible with all kinds of chips. The four lines may include a power line VBAT, a ground GND, a transmission line SPI and an identification line ID, the identification line ID could identify the installation or disassembly between the battery cover and the mobile terminal automatically. The battery cover 100 could also be replaced according to requirement.

The main control circuit 110 may also be wirelessly connected to the mobile terminal 10 through BLUETOOTH, which could further reduce the number of chip pins, and only three lines could realize data transmitting. The three lines may include the power supply line VBAT, the ground GND and the identification line ID, while the transmission lines SPI is not needed. The main control circuit 110 may also be connected to the touch circuit 130 through an I2C bus. The I2C bus has a two-way, two-wire, serial, and multi-master interface standard, which is suitable for short distance data communication and non-recurrent data communication between devices.

The power management circuit 120 may be a battery connector such as a test probe or a spring pin. The mobile terminal 10 may supply power to the e-Ink 140 through the battery connector so that the battery cover 100 does not require an additional battery, which could reduce cost and thickness.

In this embodiment, the power management circuit 120 may be a separate electronic component, while in other embodiments, the power management circuit may also be a sub-circuit of the main control circuit, and the main control circuit controls the power management circuit to supply power to the e-Ink.

Figure 2:
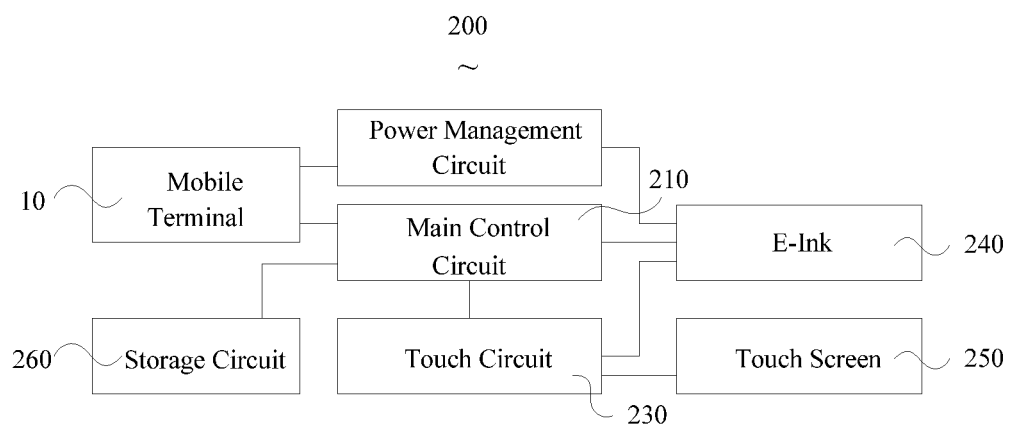
FIG. 2 is a schematic diagram of the structure of a battery cover of a mobile terminal according to a second embodiment of the present disclosure.
Figure 3:
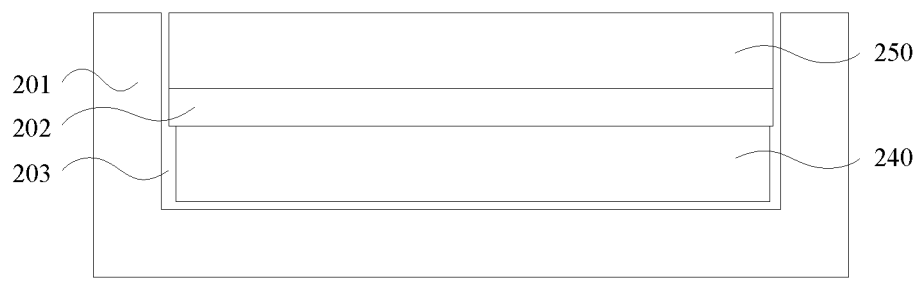
FIG. 3 is a schematic diagram of the process structure of a battery cover of a mobile terminal according to the second embodiment of the present disclosure.

Referring to FIGS. 2 to 3, a schematic diagram of the structure of a battery cover according to a second embodiment of the present disclosure and a schematic diagram of the process structure of a battery cover according to the second embodiment of the present disclosure are depicted.

As shown in FIG. 2, the battery cover 200 may further include a touch screen 250 adhered on the e-Ink 240 by adhesive material 202 (as shown in FIG. 3), and the touch screen 250 may be connected to the touch circuit 230 to touch and control the screen changing of the e-Ink 240.

As shown in FIG. 3, the battery cover 200 may include a housing 201, which may be integral or composed of different components. The housing 201 may define a cavity 203 in which the e-Ink 240 is embedded. The touch screen 250 is adhered on the e-Ink 240 by optical clear adhesive OCA and the gap between the touch screen 250 and the housing 201 may be sealed through dispensing process, which could effectively protect the e-Ink 240. Material of the touch screen 250 may be PMMA, glass or other transparent materials, so that the function of touch control and protection could be realized.

In this embodiment, the screen changing operation of the e-Ink 240 is realized by touching the touch screen 250. The touch circuit 230 may be a separate touch chip of the touch screen which is connected to the main control circuit 210 to realize communication through the Serial Peripheral Interface SPI or I2C bus.

In one embodiment, the adhesive material may be optical clear adhesive OCA or optical clear resin OCR. Particularly, the optical clear adhesive OCA has characteristics of colorless and transparent, light transmittance over 90%, good bonding strength, being cured at room temperature or medium temperature and small curing shrinkage; the optical clear resin OCR is special adhesive designed for bonding transparent optical components and can fill the gap between a panel, a transparent protective layer and an LCD module to improve the contrast of display, and is suitable for fitting and assembling the touch screen, the large-size glass substrate or other soft and hard board.

Thickness of the adhesive material may range from 0.025 mm to 0.300 mm. Furthermore, the thickness of the adhesive material may range from 0.100 mm to 0.200 mm. In one embodiment, the thickness of the adhesive material may be 0.125 mm.

In other embodiments, the battery cover 200 may further include a storage circuit 260 connected to the main control circuit 210 for storing information processed by the main control circuit 210. The main control circuit 210 may generally require a certain amount of memory for caching E-books, pictures or other data, when abundant data is needed to be cached, adding a Flash could expand memory.

Figure 4:
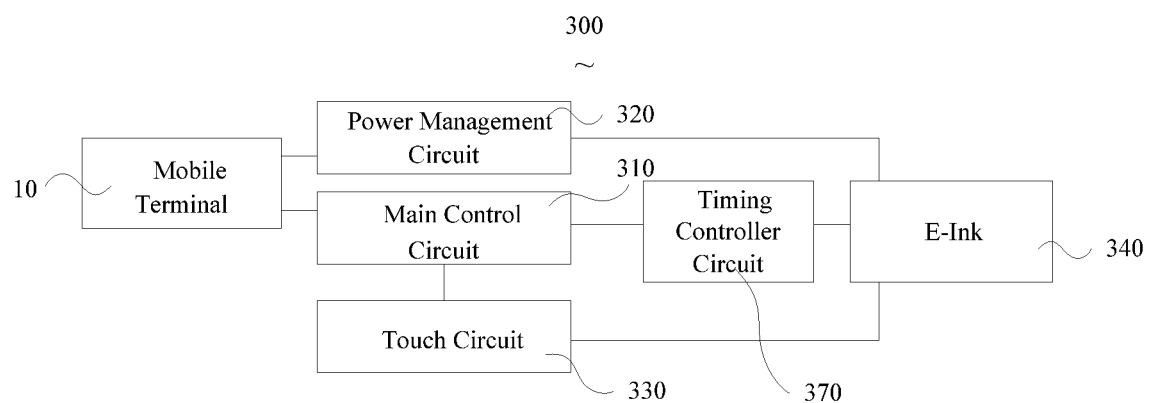
FIG. 4 is a schematic diagram of the structure of a battery cover of a mobile terminal according to a third embodiment of the present disclosure.

Referring to FIG. 4, a schematic diagram of the structure of a mobile terminal battery cover according to a third embodiment of the present disclosure is depicted.

As shown in FIG. 4, the battery cover 300 may include a main control circuit 310, a power management circuit 320, a touch circuit 330, a timing controller circuit 370 and an e-Ink 340. The power management circuit 320, the touch circuit 330 and the timing controller circuit 370 may be connected to the e-Ink respectively. The main control circuit 310 and the power management circuit 320 may be connected to the mobile terminal 10 respectively. The touch circuit 330 and the timing controller circuit 370 may be connected to the main control circuit 310 respectively. The touch circuit 330 may be configured to receive a screen changing operation of the e-Ink 340; the main control circuit 310 may be configured to receive data of the touch circuit 330, communicate with the mobile terminal 10 and drive the e-Ink 340 to display communication content via the timing controller circuit 370.

The battery cover 300 in this embodiment is suitable for an e-Ink 340 larger than 3.5 inches. Processing capacity of the e-Ink 340 larger than 3.5 inches is not enough to process the required large amount of data, therefore the timing controller circuit 370 is required to drive the e-Ink 340 to display. The other structures are the same as those of the above embodiment, and will not be described again.

Figure 5:
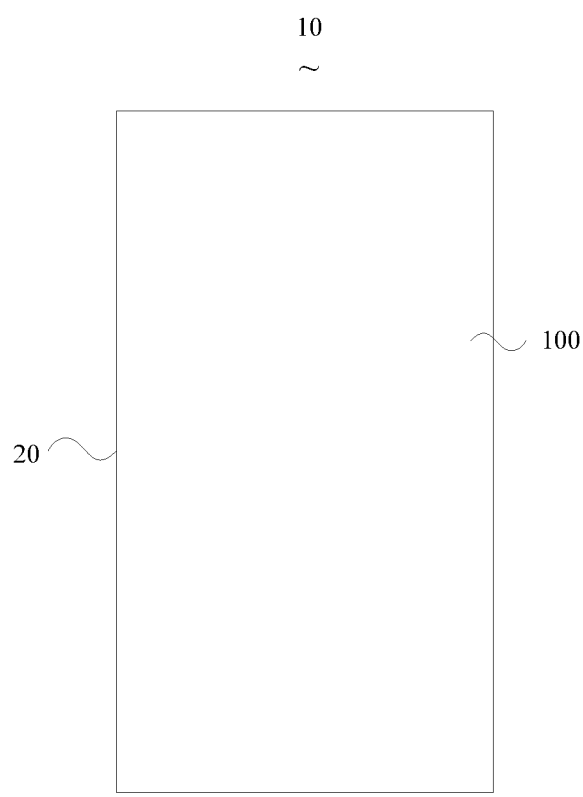
FIG. 5 is a schematic diagram of the structure of a mobile terminal according to an embodiment of the present disclosure.

Referring to FIG. 5, a schematic diagram of the structure of a mobile terminal according to an embodiment of the present disclosure is depicted.

As shown in FIG. 5, the mobile terminal 10 may include a terminal body 20 and one of the battery cover in the above-described embodiments. In one embodiment, the battery cover 100 and the terminal body 20 are separate components which could be disassembled and replaced according to demand.

The e-Ink of the battery cover 100 can project information such as two-dimensional code, individual picture, memo and so on.

The structure of the battery cover 100 can be referred to the embodiments above and will not be described herein.

In summary, it will be readily appreciated by those skilled in the art that the battery cover provided by the present disclosure has low power consumption because the e-Ink does not consume power at the time when user is reading, but consumes power only when the page is refreshed. The e-Ink looks more like the printed text so that the eyes would be more relaxed. The e-Ink has a large viewing angle and is visible under strong light, which may enhance users' reading experience.

The above-mentioned is merely an embodiment of the present disclosure and is not intended to limit the scope of the invention, and any equivalent structure or equivalent process transformation using the present specification and the accompanying drawings directly or indirectly applied in other related technical fields are included within the scope of the patent protection of the present disclosure.

What is claimed is:

1. A battery cover of mobile terminal, comprising a main control circuit, a power management circuit, a touch circuit, a timing controller circuit, and an e-Ink; wherein
the main control circuit, the power management circuit and the touch circuit are connected to the e-Ink respectively; the main control circuit and the power management circuit are connected to the mobile terminal respectively; the main control circuit is connected to the touch circuit;
the power management circuit is configured to supply power to the e-Ink; the touch circuit is configured to receive a screen changing operation of the e-Ink; and the main control circuit is configured to receive data from the touch circuit, communicate with the mobile terminal, and drive the e-Ink to display contents of communication via the timing controller circuit; wherein the timing controller is configured to enhance data processing capacity of the e-Ink;
wherein, the battery cover further comprises a touch screen adhered on the e-Ink, the touch screen is connected to the touch circuit to touch and control the screen changing of the e-Ink;
wherein, the e-Ink and the touch screen are connected to the touch circuit in parallel.

2. The battery cover of claim 1, wherein the power management circuit is a battery connector.

3. The battery cover of claim 2, wherein the main control circuit is connected to the mobile terminal through a Serial Peripheral Interface or BLUETOOTH.

4. The battery cover of claim 3, wherein the main control circuit is connected to the touch circuit through a Serial Peripheral Interface or an $I^2C$ bus; and the main control circuit is connected to the e-Ink through a Serial Peripheral Interface.

5. The battery cover of claim 1, wherein the touch screen is adhered on the e-Ink by adhesive material, the adhesive material is optical clear adhesive or optical clear resin.

6. The battery cover of claim 5, wherein thickness of the adhered material ranges from 0.025 mm to 0.300 mm.

7. The battery cover of claim 6, wherein the thickness of the adhered material ranges from 0.100 mm to 0.200 mm.

8. The battery cover of claim 1, further comprising a storage circuit connected to the main control circuit and configured to store information processed by the main control circuit.

9. A mobile terminal, comprising a terminal body and the battery cover of claim 1.

10. The mobile terminal of claim 9, wherein the power management circuit is a battery connector.

11. The mobile terminal of claim 10, wherein the main control circuit is connected to the terminal body through a Serial Peripheral Interface or BLUETOOTH.

12. The mobile terminal of claim 11, wherein the main control circuit is connected to the touch circuit through a Serial Peripheral Interface or an I2C bus; and the main control circuit is connected to the e-Ink through a Serial Peripheral Interface.

13. The mobile terminal of claim 12, wherein the touch screen is adhered on the e-Ink by adhesive material, the adhesive material is optical clear adhesive or optical clear resin.

14. The mobile terminal of claim 13, wherein thickness of the adhesive material ranges from 0.025 mm to 0.300 mm.

15. The mobile terminal of claim 14, wherein thickness of the adhesive material ranges from 0.100 mm to 0.200 mm.

16. The mobile terminal of claim 9, wherein the battery cover further comprises a touch screen adhered on the e-Ink, the touch screen is connected to the touch circuit to control the screen changing of the e-Ink.

17. The mobile terminal of claim 9, wherein the battery cover further comprises a storage circuit connected to the main control circuit and configured to store information processed by the main control circuit.

18. The battery cover of claim 1, further comprising a housing defining a cavity, the e-Ink is embedded in the cavity.

* * * * *

UNITED STATES PATENT AND TRADEMARK OFFICE
CERTIFICATE OF CORRECTION

PATENT NO. : 10,771,602 B2  
APPLICATION NO. : 15/743271  
DATED : September 8, 2020  
INVENTOR(S) : Xiulu Jin et al.

Page 1 of 1

It is certified that error appears in the above-identified patent and that said Letters Patent is hereby corrected as shown below:

On the Title Page

Item (73), Assignee should read:
"JRD COMMUNICATION (SHENZHEN) LTD, Shenzhen, (CN)".

Signed and Sealed this  
First Day of December, 2020

Andrei Iancu  
*Director of the United States Patent and Trademark Office*